FLAT CAPACITOR

Filed May 2, 1967

United States Patent Office 3,491,275
Patented Jan. 20, 1970

3,491,275

FLAT CAPACITOR

Henry F. Puppolo, Ernest N. Urfer, and Richard H. Reed, North Adams, Mass., assignors to Sprague Electric Company, North Adams, Mass., a corporation of Massachusetts Filed May 2, 1967, Ser. No. 635,443
Int. Cl. H01g *1/00*
U.S. Cl. 317—258 12 Claims

ABSTRACT OF THE DISCLOSURE

A thin insulating layer is sandwiched between a conductive terminal and the planar surface of a component, and electrical communication is provided between a component element and the overlying terminal through an aperture of the insulating layer.

BACKGROUND OF THE INVENTION

The present invention relates to components and more particularly to flat pack components and the method of manufacturing the same.

Present packaging arrangements of planar components such as capacitors, thin-film resistors and the like are subject to a number of disadvantages. For example, the completed unit is often large and bulky. Furthermore, present arrangements usually employ long lead lengths which restrict their high frequency use, and are generally not suited to automated construction.

Moreover, the component elements are often small, relatively fragile conductive areas having low mechanical adhesion to the component, such that they require delicate processing during encapsulation, as well as adequate protection by the completed enclosure. Consequently, it is desirable to provide terminals which are mechanically and conductively connected over a large area of the element and mechanically but non-conductively joined to other portions of the component.

SUMMARY OF THE INVENTION

A flat pack component provided in accordance with the invention comprises a component having a substantially planar conductive element of one surface thereof, a thin insulating layer overlying this surface with an aperture positioned over the conductive member and within its perimeter, and a conductive terminal overlying the insulative layer in electrical communication with the element by means of the aperture so as to provide a compact, essentially leadless flat pack component having a large area terminal.

In a more limited sense, a flat pack component, in accordance with the invention includes a plurality of conductive terminal plates, each overlying an insulating layer, in connection to adjacent component elements by means of conductive material contained with an aperture of the respective insulating layer.

Briefly, the process of constructing a flat pack component in accordance with the invention comprises forming a plurality of components in a coplanar arrangement, forming an insulative layer over the coplanar structure with apertures of the layer in alignment with conductive members of the components, forming a conductive layer over the insulating layer and in electrical communication with the conductive members, and cutting at least the conductive layer to provide individual large area terminals.

In the preferred process, an insulative layer and a conductive terminal layer are bonded together in a laminar construction with apertures extended through both layers. The laminate is then bonded to the coplanar arrangement of components with the apertures positioned over conductive surface portions thereof, and conductive material is deposited in the apertures, in contact with the conductive surface portions and the terminal.

In a more limited sense, the process of constructing a flat pack capacitor in accordance with the invention includes the steps of anodically oxidizing a planar sheet of valve metal to form a valve-metal oxide thereon, forming conductive electrode members on one or both of the opposing oxidized planar surfaces, forming an insulative layer over the electrodes with apertures of the insulative layer generally centered over each electrode, forming a conductive terminal layer over the insulative layer in connection to each electrode through its respective aperture, bonding the insulative layer to the component and the terminal layer, and cutting the terminal layer between electrode areas to provide separate capacitor units.

It is an object of this invention to provide an economical flat pack component.

It is a further object to provide a substantially leadless electrical unit having large area terminals.

It is a still further object of this invention to provide an essentially leadless flat pack capacitor which is relatively compact and inexpensive to manufacture.

These and other objects of the invention will be apparent from the following description, the illustrated embodiments, and the appended claims.

DESCRIPTION OF THE PREFERRED EMBODIMENTS

Figure 1:
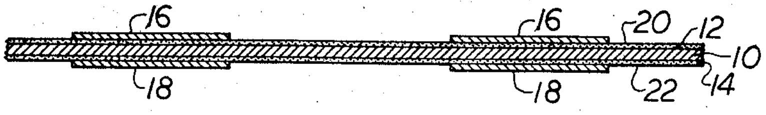
FIGURE 1 is a view in section illustrating the coplanar arrangement of a plurality of components.

In FIGURE 1, a thin planar sheet 10 of tantalum, or other valve-metal is shown having oxide layers 12 and 14 on its opposing planar surfaces and a plurality of opposing electrodes 16 and 18 positioned on the oxide surfaces 12 and 14, respectively.

This unit is constructed in a conventional manner by anodically forming a suitable valve-metal oxide, such as tantalum pentoxide or the like, on both surfaces of the tantalum sheet 10 to provide dielectric surfaces 12 and 14. Thereafter, thin conductive films 16 and 18 are deposited in opposed relationship on these surfaces. These conductive films may be deposited in any suitable manner. For example, the oxidized valve-metal surfaces 20 and 22 may be plated by electroless nickel plating or the like and portions of the metal then removed by photolithographic techniques or the like, to leave opposed electrodes 16 and 18. Other means of depositing conductive material, such as screening, dipping, rolling, sputtering, etc. are also suitable.

Figure 2:
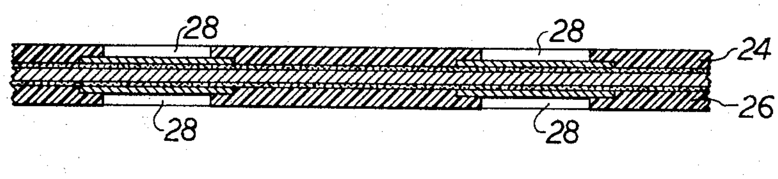
FIGURE 2 is a view in section of the structure of FIGURE 1, including overlying insulative layers.

Thereafter, as shown in FIGURE 2, insulative layers 24 and 26 are bonded to the planar surfaces 20 and 22.

These layers may be any suitable insulative material, such as a paper or plastic or the like, however, a high temperature material such as a nylon-paper composite or a polyimide such as polypyromellitimide is preferred. Apertures 28, which are provided in each layer 24 and 26, are smaller than the area of electrodes 16 and 18 and are positioned within their perimeter. The layers are bonded in place by any suitable adhesive, such as an epoxy or an acrylic or the like.

The openings 28 which may be of any suitable shape, such as circular or rectangular or the like, are designed to be close to but wholly confined within the perimeter of electrode members 16 and 18 so as to restrict the subsequently applied conductive material to within this perimeter. The apertures may be preformed in the layers before assembly by punching or the like or may be formed in situ by photolithographic techniques or the like.

Figure 3:
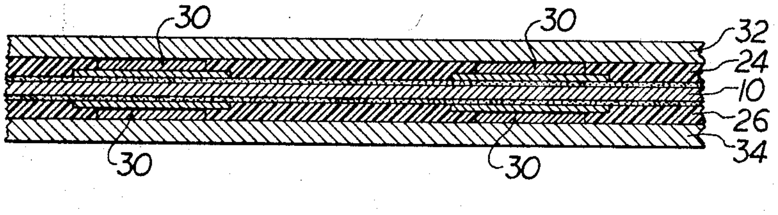
FIGURE 3 is a view in section illustrating the completed coplanar arrangement.

Thereafter as shown in FIGURE 3, conductive material, such as solder or conductive epoxy or the like, is deposited within apertures 28. Then, thin conductive terminal layers 32 and 34, such as copper or the like, are bonded with similar adhesives to the insulative layers 24 and 26 and make contact with conductive material 30.

Figure 4:
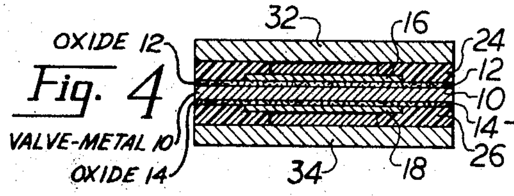
FIGURE 4 is a view in section of a component provided from the structure of FIGURE 3.

The structure is then cut between each electrode to provide individual capacitors as shown in FIGURE 4. This provides a substantially leadless device having large terminal plates 32 and 34 which extend over the full planar surface of the component. It provides a compact unit in which the fragile electrodes 16 and 18 are not subjected to undue stress during encapsulation or the rough handling associated with testing or connection to the circuit, since terminal stress is borne mainly by the insulative layer and the component body rather than by the conductive element.

The lead length of the unit is exceptionally short since it is approximately equal to the thickness of the insulating layers. Additionally, lead resistance is relatively low since the cross-sectional area of the leads is comparatively large and contact is provided to an extremely large area of the electrode. Advantageously, these factors may be further reduced by allowing terminals 32 and 34 to extend within apertures 28. This construction, which would eliminate the bridging conductive material 30, may be accomplished by forming the conductive layers 32 and 34 directly on layers 24 and 26 and within the apertures; for example, by dipping, screening, plating, or vacuum deposition of a suitable metal over the insulative layers.

In the embodiment shown in FIGURE 4, electrodes 16 and 18 are restricted within the perimeter of the diced up structure so as to protect the electrode edges and to avoid shorting them to the valve metal 10. The latter is likely to occur in the described capacitor if the electrodes are extended to the edges of the unit; however, for some components, the element may well be extended to the unit edge. In that case, it would not be necessary to form separate conductive areas as shown in FIGURE 2, since the conductive material would be cut during final dicing.

Other processes of construction are applicable, of course. For example, the insulative layers 24 and 26 may be punched, or otherwise provided with apertures, and bonded to the conductor plates 32 and 34 before their application to the component arrangement. In this case, conductive material 30 is then deposited in the apertures of the indicated laminate of insulative and conductive material, and the laminate then bonded to each face of sheet 10. Thereafter, the structure is diced as before to provide individual units.

In either of the above described arrangements, when solder or other fusible conductive material is to be employed, it may be necessary to apply localized heat on the plate over the solder filled aperture. This heat may also be utilized to set the bonding adhesives on the surfaces of the insulative layer.

Figure 5:
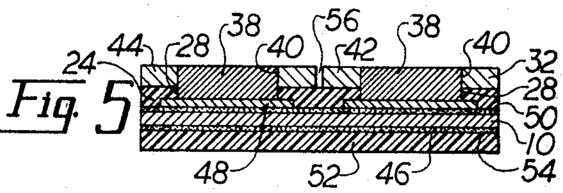
FIGURE 5 is a view in section of another embodiment which illustrates a coplanar terminal arrangement.

Alternatively, as shown in FIGURE 5, an aperture 40 may also be provided in the terminal plate 32 in approximate alignment with aperture 28 of the insulative layer. This allows conductive material 38 to be deposited in the apertures after completion of the sandwich arrangement.

FIGURE 5 also illustrates a further modification in which a capacitor is provided with coplanar terminals 42 and 44 rather than opposed terminals. This unit is constructed in a manner similar to that described in regard to FIGURES 1–3. However, in this case, spaced electrodes 46 and 48 are provided on only one side 50 of the oxidized valve metal 10. Thereafter, insulative layer 24 (having appropriate apertures 28), and terminal plate 32, (having apertures 40) are bonded to surface 50. At the same time, a full insulative layer 52 (without apertures) may be applied, for protection, over the opposing planar surface 54.

Terminal plate 32 is then cut between adjacent electrodes 46 and 48 as shown at 56, and the structure diced around both electrodes to complete the unit shown. This provides a capacitor having coplanar terminals 42 and 44 which facilitates mounting to planar circuit boards or the like.

Many modifications of the coplanar terminal arrangement of FIGURE 5 are possible. Electrodes and terminal plates could also be employed on the opposing surface 54, for example. Furthermore, the arrangement could be employed for many different components, with individual or interconnected terminals provided on the coplanar surface.

Figure 6:
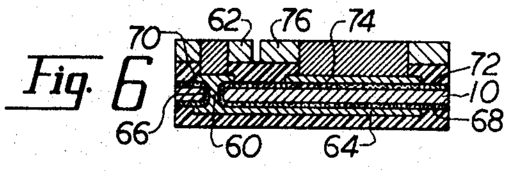
FIGURE 6 is a view in section of a further embodiment illustrating a feedthrough connection from a coplanar terminal to an element on the opposing surface.

As shown in FIGURE 6, a feed-through 60 may be included to connect one coplanar terminal 62 to an element 64 of the opposing surface. This construction is similar to that of the embodiment of FIGURE 5 with the addition of an opposing element and the feed-through arrangement 60.

In this construction, an opening 66 is provided in the valve-metal 10, before oxidizing, so that oxide will be formed on the walls of the opening. Thereafter, electrode 64 is plated over surface 68 and through hole 66 to a small contact 70 on the opposing surface 72. At the same time, a separate electrode 74 is also provided on the latter surface. Again these electrodes may be formed in a single plating step and then separated, as previously described.

The sandwich is then completed, as in the embodiment of FIGURE 5, by connecting the terminal 62 to its underlying contact 70 and terminal 76 to its underlying terminal 74. This provides a coplanar terminal arrangement in which the terminals connect to elements of both planar surfaces.

Figure 7:
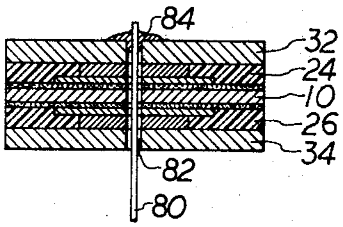
FIGURE 7 is a view in section of an embodiment illustrating a different feedthrough capacitor arrangement.

As shown in FIGURE 7, the construction may also be utilized to provide a non-polar feedthrough capacitor. The same basic structure as in FIGURE 4 is employed with, however, a feedthrough opening which allows an insulated lead 80 to pass through from one side of the unit to the other, as shown.

In this construction, a small opening 82 is provided through the sandwich construction. For example, a hole is provided in each of the parts, including the original valve metal sheet, and these are aligned during construction. Alternatively, the sandwich could be constructed and a hole then drilled through, In either case, the oxide must always be preserved between the metal electrode and the underlying valve metal sheet, Furthermore, a hole 82 must be larger than the lead wire 80 which is later extended through this opening. Once the punctured sandwich is completed, the lead is passed through and electrically connected to one of the two terminal plates, by solder 84 or the like.

Figure 8:
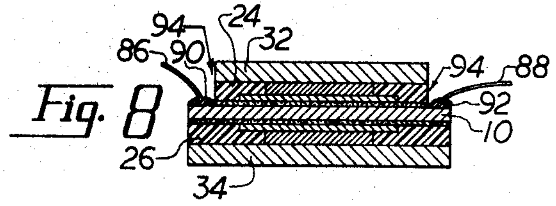
FIGURE 8 is a view in section of a feedthrough capacitor having a central connection.

Many other variations are also possible. For example, as shown in FIGURE 8, a lead 86 and a lead 88 may be directly connected, as at 90 and 92, to both ends of the valve metal member 10 to provide a polarized feedthrough capacitor. This unit is constructed similar to the sandwich of FIGURE 4, with, however, leads 86 and 88 connected to the metal layer 10.

This can be accomplished by removing an end portion of either terminal and its underlying insulator layer as shown at 94, or by extending the valve-metal from the sandwich, or otherwise connecting to its exposed edge. Connection could also be provided by utilizing additional coplanar terminals (not shown) which connect through the insulative layer and the oxide to the valve metal sheet. Furthermore, the feed-through connection of FIGURE 6 could be employed with the construction illustrated in FIGURE 8 so as to connect terminals of both surfaces.

Advantageously, many different methods and structural arrangements are possible. For example, the units may be individually assembled. Furthermore, the novel structure may be applied to flat components other than capacitors; in which case electrodes 16 and 18 may be actual elements of the component or merely contact members which connect to internal elements of the component.

Figure 9:
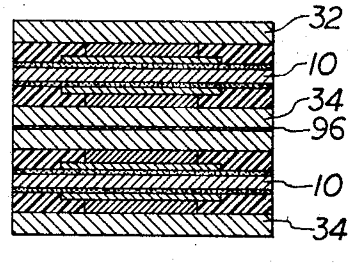
FIGURE 9 is a view in section of stacked units provided in accordance with the invention.

Stacking of the various units is also possible. For example, as shown in FIGURE 9, two or more units may be vertically stacked by mounting one on another and by soldering or otherwise connecting the adjoining or contiguous terminals, as shown at 96. This provides a series connection of the two and high voltage capability.

Increased capacitance can also be achieved by parallel connection of members of the stacked unit. For example, if the top and bottom terminals are connected in common to provide one lead of the capacitor and another lead is connected to the center terminals, the members shown will be in parallel.

Advantageously, the stacked unit can also be employed as a feedthrough capacitor by making external connection to both ends of the adjoining terminals in the center of the stack, as well as to the top and bottom terminal.

Thus, it should be understood that the above described embodiments of the invention are for purposes of illustration only, and that modifications may be made without departing from the spirit and scope of the invention, and that the invention is to be limited only by the scope of the appended claims.

What is claimed is:

1. A flat pack component comprising a valve-metal member having an oxide of the valve-metal on a planar surface thereof, a conductive film member overlying said oxide, an insulative layer disposed over said oxide with an aperture of said layer being positioned within the perimeter of said conductive member, and a conductive terminal layer overlying said insulative layer in electrical communication with said conductive member by means of said aperture.

2. A component as claimed in claim 1 wherein said electrical communication is provided by conductive material disposed within said aperture in connection to said conductive member and said terminal.

3. A component as claimed in claim 2 wherein said conductive terminal carries an aperture in registration with the aperture of said insulative layer, and said conductive material extends through both apertures to provide said electrical communication.

4. A component as claimed in claim 1 wherein said insulative layer is bonded to said component and said terminal layer.

5. A component as claimed in claim 4 wherein said conductive member is confined within the perimeter of said planar surface, and said insulative layer overlies a marginal area of said surface around said conductive member.

6. A component as claimed in claim 1 including a plurality of spaced apart conductive film members on said planar surface with an aperture of said insulative layer being positioned over each, and a plurality of coplanar terminals overlying said insulative layer in electrical communication to each conductive member through its respective aperture.

7. A component as claimed in claim 1 including a feed-through member which is in electrical connection to a conductive element of one planar surface and insulatively extends through the unit to provide connection adjacent the opposing surface.

8. A component as claimed in claim 1 including an oxide of the valve-metal on the opposing planar surface of said valve-metal member, a second conductive film member disposed on said opposing surface, a second insulative layer and a second conductive terminal layer overlying said opposing planar surface, and said second terminal being in electrical communication with said second conductive member through an aperture of said second insulative layer thereby providing a compact electrical unit having opposing terminals.

9. A component as claimed in claim 8 wherein a connection is made to said valve-metal member to provide a feedthrough capacitor.

10. A component as claimed in claim 8 wherein said valve-metal is tantalum.

11. A component as claimed in claim 8 including a vertical stacking of two or more units with electrical connection between contiguous terminal surfaces.

12. A component as claimed in claim 11 wherein each unit is a capacitor, and external connection is provided to the pair of terminals at the center of the stacked arrangement as well as to the terminal at each end of the stack.

References Cited

UNITED STATES PATENTS

| | | | |
|---|---|---|---|
| 2,487,165 | 11/1949 | Miller. | |
| 2,952,805 | 9/1960 | Dornfeld | 317—261 |
| 3,002,137 | 9/1961 | Kahn | 317—261 |
| 3,195,027 | 7/1965 | Vandermark | 317—261 X |
| 3,350,498 | 10/1967 | Leeds | 174—68.5 |
| 3,379,943 | 4/1968 | Breedlove | 317—261 X |
| 3,397,452 | 8/1968 | Taraud. | |

E. A. GOLDBERG, Primary Examiner

U.S. Cl. X.R.

117—212; 174—68.5; 317—261